US012061308B2

(12) United States Patent
Grau et al.

(10) Patent No.: US 12,061,308 B2
(45) Date of Patent: Aug. 13, 2024

(54) POROSITY MEASUREMENTS FROM NUCLEAR SPECTROSCOPY

(71) Applicant: Schlumberger Technology Corporation, Sugar Land, TX (US)

(72) Inventors: James Grau, Marshfield, MA (US); Jeffrey Miles, Arlington, MA (US); Richard Radtke, Pearland, TX (US); Laurent Mosse, Bucharest (RO); ZhanGuo Shi, Houston, TX (US); David Rose, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/929,446

(22) Filed: Sep. 2, 2022

(65) Prior Publication Data

US 2024/0077637 A1 Mar. 7, 2024

(51) Int. Cl.
*G01V 5/10* (2006.01)

(52) U.S. Cl.
CPC .................................... *G01V 5/102* (2013.01)

(58) Field of Classification Search
CPC ...................................................... G01V 5/102
See application file for complete search history.

(56) References Cited

U.S. PATENT DOCUMENTS

2011/0285398 A1 11/2011 Villegas et al.
2012/0215451 A1 8/2012 Husser et al.
2016/0003025 A1 * 1/2016 Beekman ................ G01V 5/10 250/269.5
2017/0315260 A1 11/2017 Stoller

FOREIGN PATENT DOCUMENTS

EP 3052755 B1 7/2020
WO WO 2013040529 A1 * 3/2013 ............ G01V 5/045

OTHER PUBLICATIONS

Radke et al., 2012, A New Capture and Inelastic Spectroscopy Tool Takes Geochemical Logging to the Next Level, Transactions of the SPWLA 53rd Annual Logging Symposium, Cartagena, Colombia, Jun. 16-20, 2012, Paper 103.

(Continued)

*Primary Examiner* — David P Porta
*Assistant Examiner* — Fani Polyzos Boosalis
(74) *Attorney, Agent, or Firm* — Frederick Carbone

(57) ABSTRACT

Systems and method presented herein enable the estimation of porosity using neutron-induced gamma ray spectroscopy. For example, the systems and methods presented herein include receiving, via a control and data acquisition system, data relating to energy spectra of gamma rays captured by one or more gamma ray detectors of a neutron-induced gamma ray spectroscopy logging tool. The method also includes deriving, via the control and data acquisition system, one or more spectral yields relating to one or more elemental components from the data relating to the energy spectra of the gamma rays. The method further includes estimating, via the control and data acquisition system, a measurement of porosity based on the one or more spectral yields relating to the one or more elemental components.

20 Claims, 6 Drawing Sheets

80

RECEIVING, VIA A CONTROL AND DATA ACQUISITION SYSTEM, DATA RELATING TO ENERGY SPECTRA OF GAMMA RAYS CAPTURED BY ONE OR MORE GAMMA RAY DETECTORS OF A NEUTRON-INDUCED GAMMA RAY SPECTROSCOPY LOGGING TOOL — 82

DERIVING, VIA THE CONTROL AND DATA ACQUISITION SYSTEM, ONE OR MORE SPECTRAL YIELDS RELATING TO ONE OR MORE ELEMENTAL COMPONENTS FROM THE DATA RELATING TO THE ENERGY SPECTRA OF THE GAMMA RAYS — 82

ESTIMATING, VIA THE CONTROL AND DATA ACQUISITION SYSTEM, A MEASUREMENT OF POROSITY BASED ON THE ONE OR MORE SPECTRAL YIELDS RELATING TO THE ONE OR MORE ELEMENTAL COMPONENTS — 82

(56) References Cited

OTHER PUBLICATIONS

Miles et al., 2020, Formation Chlorine Measurement from Spectroscopy Enables Water Salinity Interpretation: Theory, Modeling, and Applications, Petrophysics 61: 549-569.
Interntional Search Report and Written Opinion issued in the PCT Application PCT/US2023/031864 dated Dec. 21, 2023, 11 pages.
Galford, J. et al., "Field Test Results of New Neutron-Induced Gamma-Ray Spectroscopy Geochemical Logging Tool", SPE 123992, 2009, presented at the SPE Annual Technical Conference and Exhibition, New Orleans, Louisiana, U.S.A., 22 pages.

* cited by examiner

POROSITY MEASUREMENTS FROM NUCLEAR SPECTROSCOPY

BACKGROUND

The present disclosure generally relates to neutron-induced gamma ray spectroscopy and the estimation of porosity and/or hydrogen index (HI) in bulk media that are traversed by a wellbore. More specifically, the embodiments described herein use energy spectra and at least one of the resulting spectral yields as a principal input for estimating porosity or HI.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Formation porosity and HI are essential measurements for the characterization of oil and gas reservoirs. Porosity represents the volume fraction of the bulk rock that is occupied by pores within the solid matrix. Partitioning of the total porosity into sub-units (e.g., effective porosity, free fluid volume, bound fluid volume, and so forth) is also common. HI is typically defined as the ratio of the molar concentration of hydrogen atoms in the bulk rock with respect to the molar concentration of hydrogen in pure water at standard temperature and pressure.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Certain embodiments described herein include a method that includes receiving, via a control and data acquisition system, data relating to energy spectra of gamma rays captured by one or more gamma ray detectors of a neutron-induced gamma ray spectroscopy logging tool. The method also includes deriving, via the control and data acquisition system, one or more spectral yields relating to one or more elemental components from the data relating to the energy spectra of the gamma rays. The method further includes estimating, via the control and data acquisition system, a measurement of porosity based on the one or more spectral yields relating to the one or more elemental components.

In addition, certain embodiments described herein include a system that includes a neutron-induced gamma ray spectroscopy logging tool and a control and data acquisition system. The neutron-induced gamma ray spectroscopy logging tool includes a neutron source configured to generate neutrons to induce energy spectra of gamma rays, and one or more gamma ray detectors configured to detect the energy spectra of the gamma rays. The control and data acquisition system is configured to receive data relating to the energy spectra of the gamma rays captured by the one or more gamma ray detectors of the neutron-induced gamma ray spectroscopy logging tool. The control and data acquisition system is also configured to derive one or more spectral yields relating to one or more elemental components from the data relating to the energy spectra of the gamma rays. The control and data acquisition system is further configured to estimate a measurement of porosity based on the one or more spectral yields relating to the one or more elemental components.

In addition, certain embodiments described herein include a control and data acquisition system that includes one or more processors configured to execute instructions stored on memory media of the control and data acquisition system, wherein the instructions, when executed by the one or more processors, cause the control and data acquisition system to receive data relating to energy spectra of gamma rays captured by one or more gamma ray detectors of a neutron-induced gamma ray spectroscopy logging tool, to derive one or more spectral yields relating to one or more elemental components from the data relating to the energy spectra of the gamma rays, and to estimate a measurement of porosity based on the one or more spectral yields relating to the one or more elemental components.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
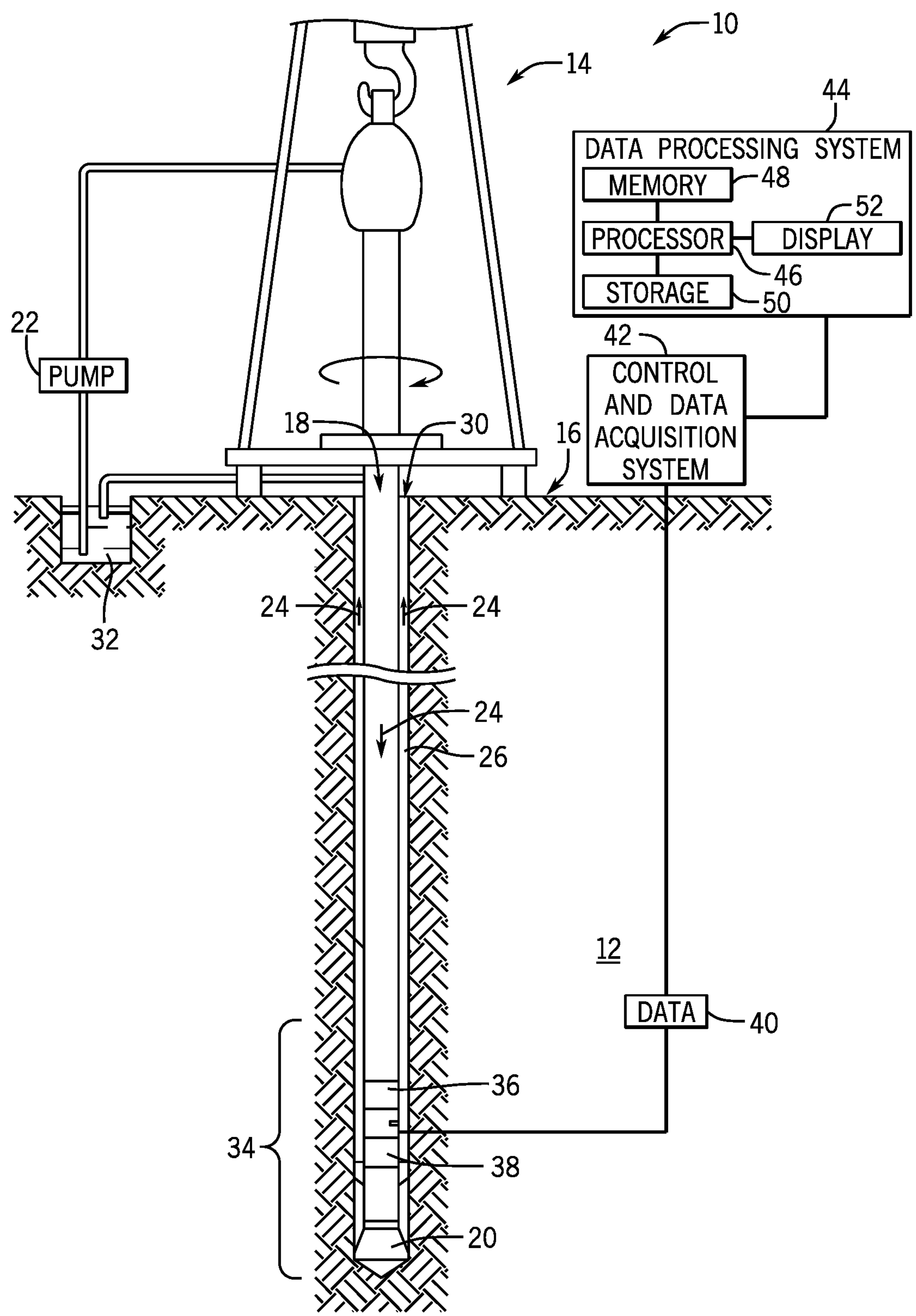
FIG. 1 illustrates a drilling system having a neutron-induced gamma ray spectroscopy logging tool, in accordance with embodiments of the present disclosure.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Rock properties (e.g., matrix properties) may influence a bulk formation response of well-logging measurements and, as such, it may be desirable to determine accurate rock properties to accurately interpret well-logging measurements with respect to certain formation properties, such as porosity, hydrogen index (HI), saturation, and permeability. For example, a rock property such as the matrix grain density may be used to provide an accurate determination of formation porosity using the measurement of formation bulk density. At least in some instances, certain rock properties may be difficult to measure directly or otherwise unobtainable and may be inferred from other measurable characteristics of the rock, such as elemental concentrations measured by downhole neutron spectroscopy, such as neutron-induced gamma ray spectroscopy. Neutron-induced gamma ray spectroscopy may be used to derive certain rock characteristics of a formation based on elemental concentrations within a geological formation. In neutron-induced gamma ray spectroscopy, fast neutrons and thermal neutrons generated from a naturally radioactive material or pulsed-neutron generator contained within the housing of the logging sonde (e.g., a portion of a well logging tool that includes sensors) may interact with elemental nuclei in a geological formation and produce gamma radiation from inelastic nuclear reactions and neutron-capture reactions in a local volume surrounding the logging sonde. The produced gamma rays traverse the geological formation, and some of the gamma rays are detected by a detector (e.g., sensor) contained within the housing of the logging sonde. The detector signal is used to produce spectra indicating contributions from gamma rays representing the elemental nuclei in the formation. Gamma ray spectra associated with inelastic scattering and with thermal-neutron capture can be quantified separately. Inelastic and capture spectra may be plotted as count rate versus energy. The spectra contain information about the element identity (i.e., from the characteristic energies of the gamma rays) and about the element concentration (i.e., from the number or relative number of counts).

In any case, a mathematical method may be utilized to quantitatively estimate or infer certain rock properties (e.g., matrix properties) directly from elemental concentrations associated with certain elemental components such as silicon, calcium, iron, magnesium, and sulfur. These rock properties include, for example, one or more mineral concentrations in the rock matrix, matrix grain density, matrix neutron porosity response, and aluminum concentration in the rock matrix.

Conventional methods of estimating porosity and HI rely on log measurements of bulk density, neutron porosity, nuclear magnetic resonance, or some combination thereof. For example, total porosity may be computed from bulk density with inputs on the density of the solid rock matrix and pore fluid components. In addition, measurements of neutron transport may also be used to infer porosity or HI. The porosity or HI estimate may then be calibrated to the rate of counts at one or more detectors. In conventional neutron porosity measurements, a source emits neutrons into the surrounding medium, and the detectors respond to neutrons that arrive in the thermal or epithermal energy regime. These porosity measurements may be known variously as TNPH, NPHI, NPOR, APLC, and other mnemonics. Other neutron porosity techniques are based on the emission of neutrons from a source and the detection of a total count rate of gamma rays in a certain time window, at one or more detectors. No energy spectroscopy is applied to the gamma rays in the latter technique. These porosity measurements may be known as TPHI or other mnemonics. Nuclear magnetic resonance (NMR) provides another technique for measuring porosity or HI. The total hydrogen content of a formation, the distribution of the pore sizes, and other information about the fluids may be inferred from the amplitude of the NMR signal and its rates of relaxation. In general, operational challenges prevent the acquisition of porosity and HI logs with these established techniques in certain environments.

The embodiments described herein provide systems and methods for estimating porosity from neutron-induced gamma ray spectroscopy measurements. For example, certain embodiments described herein use the spectral yield of epithermal neutrons captured in a spectroscopy detector, which may be calibrated to formation porosity, HI, or other related properties. In addition, certain embodiments described herein use the spectral yield of hydrogen as the basis for measurements of formation porosity, HI, or other related properties. The calibrations may account for other environmental effects, and the algorithms may be designed empirically, or may utilize machine learning. In addition, the systems and methods described herein may be derived based on data from the laboratory, computer modeling, or downhole log data.

With the foregoing in mind, FIG. 1 illustrates a drilling system 10 having a neutron-induced gamma ray spectroscopy logging tool, as described in greater detail herein. The drilling system 10 may be used to drill a well into a geological formation 12 and obtain gamma ray spectroscopy measurements useful to identify characteristics of the well. In the drilling system 10 illustrated in FIG. 1, a drilling rig 14 at the surface 16 may rotate a drill string 18 having a drill bit 20 at its lower end. As the drill bit 20 is rotated, a drilling fluid pump 22 is used to pump drilling fluid 24, commonly referred to as "mud" or "drilling mud", downward through the center of the drill string 18 in the direction of the arrow to the drill bit 20. The drilling fluid 24, which is used to cool and lubricate the drill bit 20, exits the drill string 18 through the drill bit 20. The drilling fluid 24 then carries drill cuttings away from the bottom of a borehole 26 as it flows back to the surface 16, as illustrated by the arrows through an annulus 30 between the drill string 18 and the formation 12.

However, as described above, as the drilling fluid 24 flows through the annulus 30 between the drill string 18 and the formation 12, the drilling fluid 24 may begin to invade and mix with the fluids stored in the formation 12, which may be referred to as formation fluid (e.g., natural gas or oil). At the surface 16, the return drilling fluid 24 may be filtered and conveyed back to a mud pit 32 for reuse.

As illustrated in FIG. 1, the lower end of the drill string 18 includes a bottom-hole assembly (BHA) 34 that may include the drill bit 20 along with various downhole tools. The downhole tools may collect a variety of information relating to the geological formation 12 and/or the state of drilling of the well. For example, a measurement-while-drilling (MWD) module 36 may measure certain drilling parameters, such as the temperature, pressure, orientation of the drilling tool, and so forth. Likewise, a logging-while-drilling (LWD) module 38 may measure the physical properties of the geological formation 12, such as density, porosity, resistivity, lithology, and so forth.

The LWD module 38 may collect a variety of data 40 that may be stored and processed within the LWD module 38 or, as illustrated in FIG. 1, may be sent to the surface for processing. In the example of this disclosure, the LWD module 38 may include a neutron-induced gamma ray spectroscopy logging tool that may detect the energies of formation gamma rays that result when neutrons are emitted into the well. The range of energies of the detected gamma rays may be visualized as a spectrum of the gamma rays that are detected. The data 40 that is collected may include counts and/or detected energies of neutrons and gamma rays that reach corresponding detectors in the LWD module 38. It should be appreciated that while the embodiment illustrated in FIG. 1 is directed to collecting data via an LWD module 38, in other embodiments, wireline tools may be used as the conveyance mode. In other words, the neutron-induced gamma ray spectroscopy logging tool may be deployed into the borehole 26 via logging-while-drilling (LWD), wireline, coiled tubing, or any other suitable mode of downhole conveyance.

The data 40 may be sent via a control and data acquisition system 42 to a data processing system 44. The control and data acquisition system 42 may receive the data 40 in any suitable way. In certain embodiments, the control and data acquisition system 42 may transfer the data 40 via electrical signals pulsed through the geological formation 12 or via mud pulse telemetry using the drilling fluid 24. In other embodiments, the data 40 may be retrieved directly from the LWD module 38 when the LWD module 38 returns to the surface. As described in greater detail herein, the control and data acquisition system 42 may be configured to estimate porosity using neutron-induced gamma ray spectroscopy data 40 provided by the LWD module 38. In addition, in certain embodiments, the control and data acquisition system 42 may be configured to control any and all operational parameters of the BHA 34 including, but not limited to, operations of a neutron-induced gamma ray spectroscopy logging tool of the LWD module 38, as described in greater detail herein.

In certain embodiments, the data processing system 44 may include a processor 46, memory 48, storage 50, and/or a display 52. The data processing system 44 may use the data 40 to determine various properties of the formation 12 using any suitable techniques. As will be described in greater detail herein, the LWD module 38 may use certain selected materials to reduce signal contamination by stray neutrons. Thus, when the data processing system 44 processes the data 40, the determined formation properties may be more accurate and/or precise than otherwise. To process the data 40, the processor 46 may execute instructions stored in the memory 48 and/or storage 50. As such, the memory 48 and/or the storage 50 of the data processing system 44 may be any suitable article of manufacture that can store the instructions. The memory 48 and/or the storage 50 may be ROM memory, random-access memory (RAM), flash memory, an optical storage medium, or a hard disk drive, to name a few examples. The display 52 may be any suitable electronic display that can display logs and/or other information relating to properties of the formation 12 as measured by the LWD module 38. It should be appreciated that, although the data processing system 44 is illustrated as being located at the surface, the data processing system 44 may be located in the LWD module 38. In such embodiments, some of the data 40 may be processed in the LWD module 38 and the data 40 may be stored in the LWD module 38, while some of the data 40 may be sent to the surface in real time. This may be the case particularly in LWD, where a limited amount of the data 40 may be transmitted to the surface during drilling or reaming operations.

Figure 2:
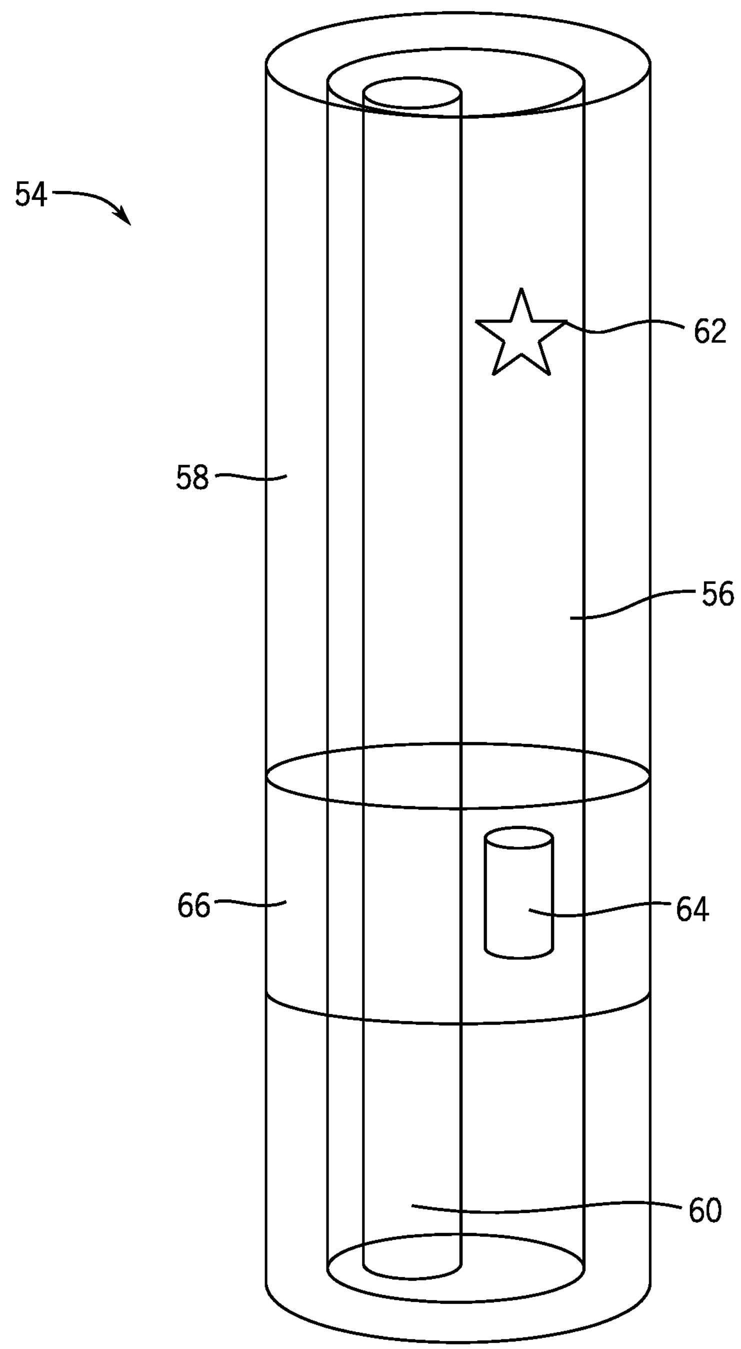
FIG. 2 illustrates a schematic block diagram side view of an illustrative embodiment of an LWD module being or including a neutron-induced gamma ray spectroscopy logging tool, in accordance with embodiments of the present disclosure.

As described in greater detail herein, the LWD module 38 may be or include a neutron-induced gamma ray spectroscopy logging tool. FIG. 2 illustrates a schematic block diagram side view of an illustrative embodiment of an LWD module 38 being or including a neutron-induced gamma ray spectroscopy logging tool 54. In certain embodiments, the spectroscopy logging tool 54 may include a chassis 56, a collar 58, and a flow tube 60 that extends through the spectroscopy logging tool 54. In certain embodiments, a neutron source 62 is located at a first location within the spectroscopy logging tool 54 and one or more gamma ray detectors 64 are located at a second location axially spaced from the neutron source 62. In addition, in certain embodiments, a neutron shield 66 (e.g., such as a boron shield) may be radially disposed about the spectroscopy logging tool 54 at or near the second location. Specifics regarding this embodiment and other embodiments of spectroscopic logging tools employing the general configuration or aspects of the LWD module 38 and the spectroscopy logging tool 54 are envisaged for use with any suitable means of conveyance, such as wireline, coiled tubing, logging while drilling (LWD), and so forth. Further, information regarding the environment, such as the sigma of the formation 12, sigma of the drilling fluid 24, density, borehole size, and slowdown length, may be acquired using additional equipment.

In general, neutrons emitted by the neutron source 62 may interact with the surrounding formation 12 in ways that produce gamma rays through inelastic scattering and/or neutron capture. Inelastic scattering may produce gamma rays through interactions with fast neutrons and elements of the formation 12. Neutron capture may produce gamma rays from the capture of mostly thermal and epithermal neutrons by a nucleus. The formation gamma rays may be detected by the gamma ray detectors 64. In certain embodiments, the gamma ray detectors 64 may be scintillation detectors that include a scintillation crystal and a photomultiplier. In certain embodiments, the gamma ray detectors 64 may detect the spectra—that is, the range of energies—of the formation gamma rays. However, in certain embodiments, the gamma ray detectors 64 may detect gamma rays that occur in the borehole 26 or the spectroscopy logging tool 54 itself. Indeed, in certain embodiments, the neutrons emitted by the neutron source 62 may scatter through or around the neutron shield 66 and other surrounding materials to generate gamma rays from unintended locations. For example, other gamma rays may be generated, for example, by neutrons reacting with elements of the drilling fluid 24 in the borehole 26, the neutron shield 66, the chassis 56, the collar 58, the gamma ray detectors 64 themselves, drilling fluid 24 within the flow tube 60, and/or the flow tube 60 itself, to name only a few locations from which additional gamma rays may be generated. The gamma rays generated through these reactions outside of the formation 12 may not provide substantial information regarding the properties of the geological formation 12. As such, in certain embodiments, the spectra of these gamma rays generated outside of the geological formation 12 may represent noise to be subtracted from the overall spectral signal by the control and data acquisition system 42. Otherwise, the presence of this background noise may increase the uncertainty of the gamma ray spectroscopy measurements.

The nuclear spectroscopy provided by the spectroscopy logging tool 54 illustrated in FIG. 2 may provide a wealth of information on the elemental composition of materials around the spectroscopy logging tool 54. In certain embodiments, an electronic, pulsed neutron generator (PNG) of the neutron source 62 may create pulses of energetic neutrons that interact with surrounding nuclei to induce gamma rays. In general, the gamma ray detectors 64 of the spectroscopy logging tool 54 detect the energy spectra of these gamma rays. As described in greater detail herein, the control and data acquisition system 42 may analyze the energy spectra to provide separate spectra for inelastic and capture reactions, each carrying complementary information from different sets of elements (e.g., elemental components of the surrounding formation 12). The elemental yields from these spectra respond to the geochemistry of the formation rock as well as solid organic matter, pore fluids, and the borehole 26.

Figure 3:
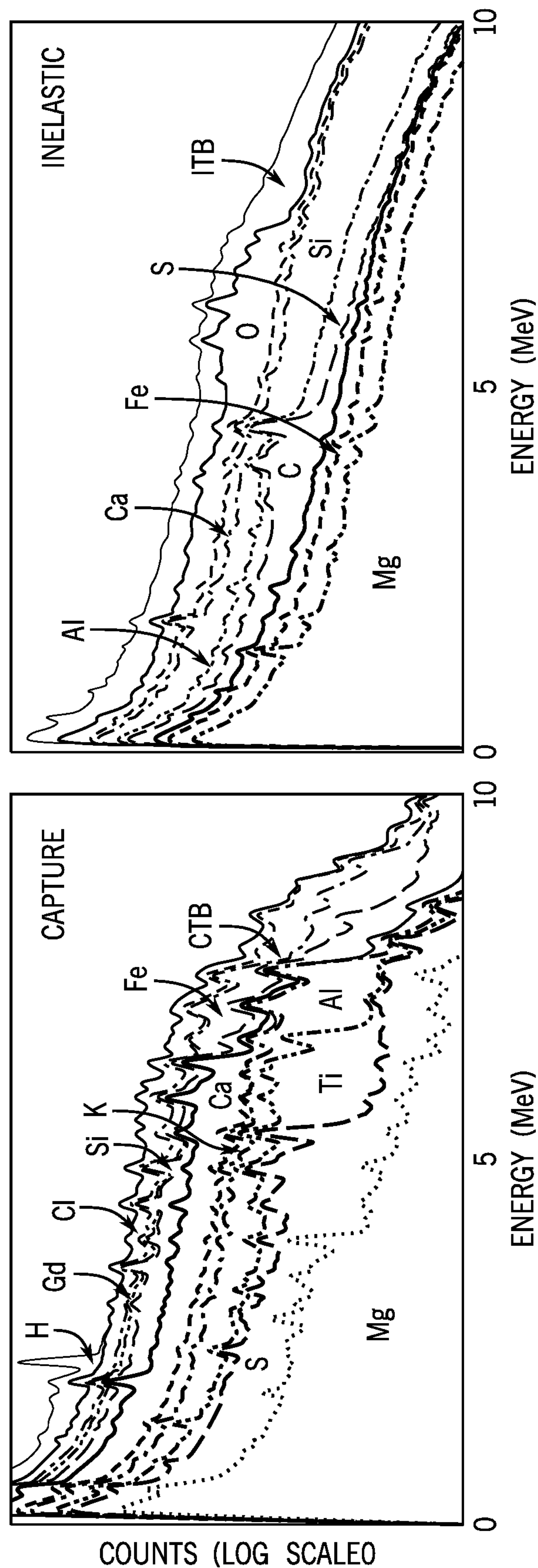
FIG. 3 illustrates an example of inelastic and capture spectra from the neutron-induced gamma ray spectroscopy logging tool, showing gamma ray spectra of various elemental components from thermal neutron radiative capture and inelastic reactions, in accordance with embodiments of the present disclosure.

FIG. 3 illustrates an example of inelastic and capture spectra from the spectroscopy logging tool 54, showing gamma ray spectra of various elemental components from thermal neutron radiative capture (left graph) and inelastic reactions (right graph). As illustrated, in certain embodiments, the thermal neutron radiative capture elemental components may include magnesium (Mg), sulfur (S), titanium (Ti), aluminum (Al), potassium (K), calcium (Ca), silicon (Si), iron (Fe), chlorine (Cl), gadolinium (Gd), hydrogen (H), whereas the inelastic reaction elemental components may include magnesium (Mg), iron (Fe), sulfur (S), carbon (C), aluminum (Al), silicon (Si), calcium (Ca), and oxygen (O). In addition, the capture tool background (CTB) and inelastic tool background (ITB) are shown in the respective graphs.

The spectroscopy analysis described herein may provide information relating to formation chemistry, mineralogy, organic carbon, and chlorine concentration. The total pore volume or hydrogen index (HI) is not conventionally the focus of spectroscopy interpretation. However, it has been found that the raw spectral yields respond to formation porosity and hydrogen content. Several candidate yields have been found to be the most promising and are noted in greater detail below.

The embodiments described herein are configured to estimate a measurement of porosity from an algorithm (or set of algorithms) that uses one or more spectral yields as derived from energy spectra in neutron-induced gamma ray spectroscopy enabled by the spectroscopy logging tool 54. In certain embodiments, the porosity is a volume fraction of pore space in the bulk formation rock of the surrounding formation 12. In other embodiments, the porosity is an HI in the bulk formation rock of the surrounding formation 12.

In certain embodiments, the spectral yield is a yield associated with gamma rays induced by epithermal neutrons captured primarily by the gamma ray detectors 64 of the spectroscopy logging tool 54. In other embodiments, the spectral yield is a yield of gamma rays from neutrons captured by hydrogen. In certain embodiments, the spectral yields are derived from an energy spectrum of gamma rays induced by inelastic reactions of nuclei with fast neutrons, also known as an inelastic spectrum. In other embodiments, the spectral yields are derived from an energy spectrum of gamma rays induced by radiative capture of neutrons by nuclei, also known as a capture spectrum. In certain embodiments, the spectral yields represent the relative fraction of the energy spectrum that is associated with a particular elemental component. In addition, in certain embodiments, the spectral yields represent an absolute count rate that a particular element or spectral component contributes to the overall energy spectrum.

In certain embodiments, the algorithms account for environmental effects proximate the spectroscopy logging tool 54 including, but not limited to, HI of the pore fluids and formation matrix, HI of the borehole fluid, formation lithology, formation and borehole salinity, temperature, pressure, borehole size, tool standoff, and invasion. In certain embodiments, some of the environmental effects used to correct the porosity may be determined from the spectroscopy measurement itself (e.g., the detection of gamma rays) including, but not limited to, formation lithology and formation and borehole salinity.

In certain embodiments, the algorithms may be derived based at least in part on laboratory data, computer modeling, downhole log data, or some combination thereof. In addition, in certain embodiments, the algorithms may be designed empirically based at least in part on human judgment. In addition, in certain embodiments, the algorithms may be at least partially based on machine learning including, but not limited to, techniques such as multi-linear regression, a neural network, a support vector machine, a decision tree, an extended neural network architecture that may include a recurrent network, a long-short-term memory (LSTM) network, an attention model, or ensemble methods that combine multiple instances of the aforementioned techniques.

In certain embodiments, the neutrons may be generated by a radiochemical neutron source 62 including, but not limited to, Americium-Beryllium (AmBe) or Californium-252 (Cf-252). In other embodiments, the neutrons may be generated by a pulsed neutron generator 62. As described above, in certain embodiments, the spectroscopy analysis may be performed based on energy spectra acquired at one or more gamma ray detectors 64 of the spectroscopy logging tool 54. In certain embodiments, the one or more gamma ray detectors 64 may include scintillator detectors. In addition, in certain embodiments, the one or more gamma ray detectors 64 may include solid-state detectors. In certain embodiments, the aforementioned instruments for acquiring the spectroscopy measurements may be deployed via logging-while-drilling (LWD), wireline, coiled tubing, or other modes of downhole conveyance.

Epithermal Neutron Yield

As described in greater detail herein, in certain embodiments, the inelastic spectrum may contain a component of gamma rays that arise primarily from the capture of epithermal neutrons inside scintillator crystals of the gamma ray detectors 64 of the spectroscopy logging tool 54 during, or just after, the neutron burst. The corresponding spectral yield is a proxy for the population of epithermal neutrons at the gamma ray detectors 64 of the spectroscopy logging tool 54. Neutrons may be slowed most efficiently by hydrogen, a fact that forms the basis of classic neutron porosity measurements. In this view, the spectral yield may be interpreted as a single-detector, uncompensated epithermal neutron porosity measurement. The embodiments described herein use such measurements to estimate porosity, as described in greater detail herein. In certain embodiments, the spectrally derived epithermal neutron measurements using the gamma ray detectors 64 are enabled by utilizing an elemental standard representing the spectral shape of the gamma rays produced by the capture of epithermal neutrons inside the gamma ray detectors 64.

Figure 4:
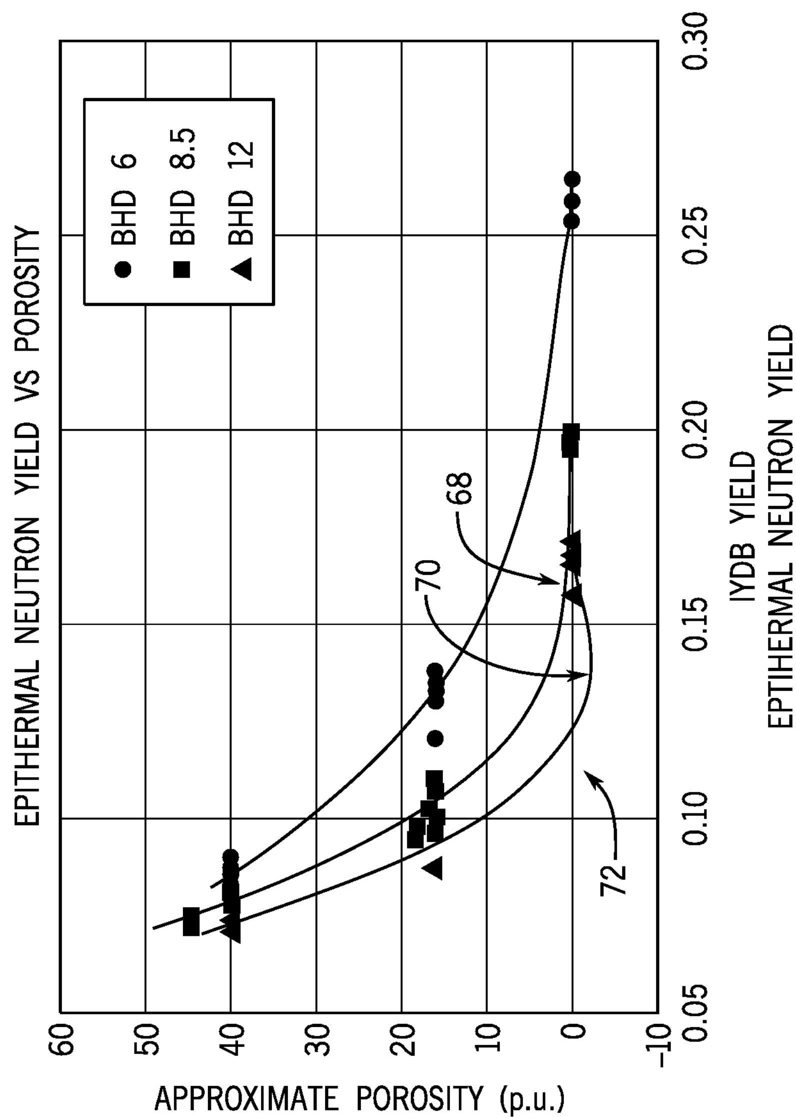
FIG. 4 illustrates an example of epithermal neutron yield in laboratory formations, plotted with respect to true formation porosity, in accordance with embodiments of the present disclosure.

The spectral yield is likely to respond to the distribution of all hydrogen around the spectroscopy logging tool 54. In addition to formation porosity, the spectral yield may be affected by the HI of the pore fluids and formation matrix, HI of the borehole fluid, borehole size, tool standoff, and invasion. FIG. 4 illustrates an example of epithermal neutron yield in laboratory formations, plotted with respect to true formation porosity (p.u.). The graph illustrates true formation porosity (p.u.) with respect to the spectral yield of epithermal tool background as measured by a spectroscopy logging tool 54 in laboratory formations. Each borehole diameter (BHD) 68, 70, 72 (i.e., 6 inches, 8.5 inches, and 12 inches, respectively) shows a distinct trend of porosity versus epithermal neutron yield.

Figure 5A:
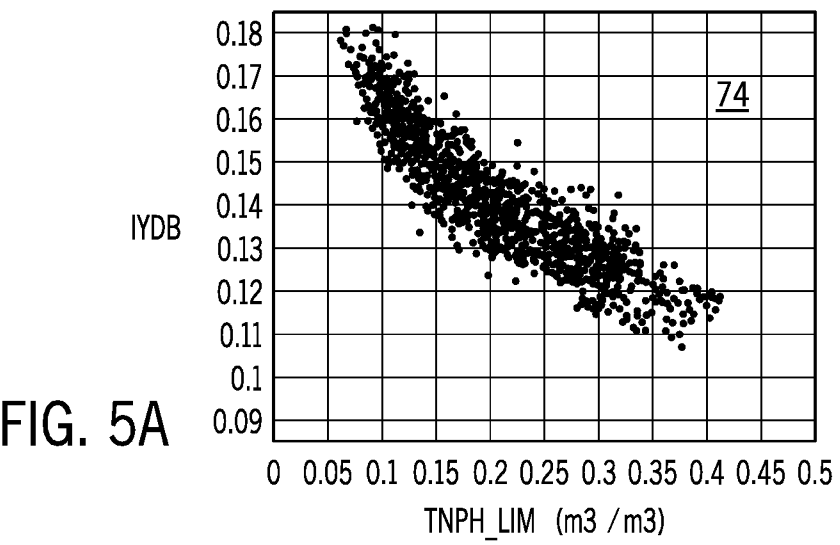
FIGS. 5A through 5C illustrate example spectroscopy data in cross plots including inelastic tool background yield and hydrogen yield and methods of estimating porosity, in accordance with embodiments of the present disclosure.
Figure 5B:
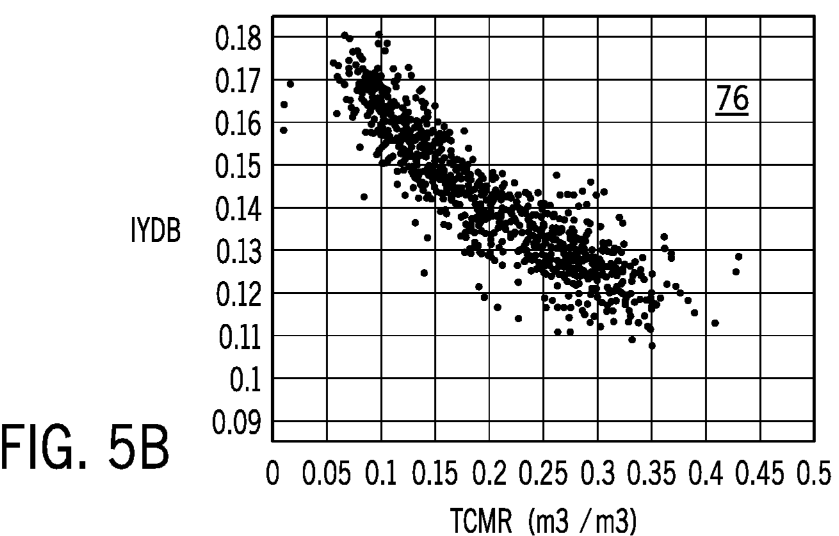
Figure 5C:
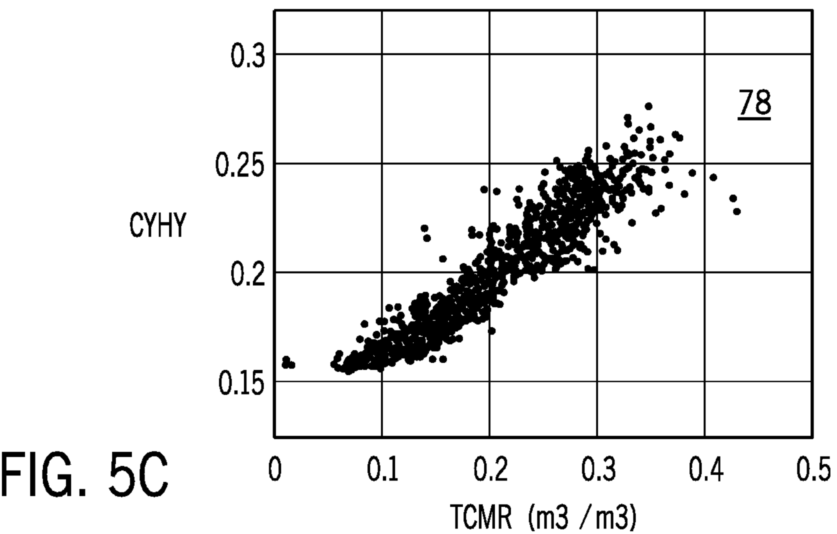

FIGS. 5A through 5C illustrate example spectroscopy data in cross plots including inelastic tool background yield and hydrogen yield and methods of estimating porosity. In particular, FIG. 5A is a cross plot 74 that shows correlation between thermal neutron porosity from a dedicated neutron porosity tool (TNPH_LIM) and the inelastic tool background yield (IYDB) from a spectroscopy logging tool. In addition, FIG. 5B is a cross plot 76 that shows correlation between inelastic tool background yield (IYDB) and total porosity from a NMR tool (TCMR). In addition, FIG. 5C is a cross plot 78 that shows correlation between capture hydrogen yield (CYHY) and total porosity from a NMR tool (TCMR).

It should be noted that, in general, there are two separate inelastic tool background yields and inelastic elemental standard spectra. The first, whose yield is named IYTB, involves the detection of gamma rays produced mostly by fast neutron inelastic scattering reactions with elements that are part of the logging sonde body, which are mostly from various metallic alloys. This spectral yield is typically 40-50% of the measured inelastic spectrum. There is very little environmental dependence to this yield, which actually makes it relatively difficult to isolate its unique spectral response, which is required for the spectral analysis. The second, whose yield is named IYDB, involves the detection of gamma rays produced mostly by epithermal neutron captures inside a detector crystal itself. This yield is typically less than half of the IYTB yield, and it is relatively environmentally dependent. This yield turns the detector crystal into an epithermal neutron detector, which is quite sensitive to formation porosity and to hydrogen index.

In addition, it should also be noted that that gamma-ray spectrum is composed of at least six separate parts: (a) gamma rays produced by the inelastic scattering of high energy neutrons, (b) gamma rays produced by the capture of epithermal neutrons, (c) gamma rays produced by neutron-induced nuclear reactions that change the nucleus to a different element and produce promptly decaying gamma rays, (d) gamma rays produced by neutron-induced nuclear reactions that change the nucleus to a different element and produce gamma rays that do not decay promptly, (e) gamma rays produced by the capture of thermal energy neutrons created both during the burst and from previous bursts, and (f) gamma rays from naturally occurring radioactive elements. In certain embodiments, gamma rays from parts d, e, and f may be removed from the burst spectrum prior to analysis using judiciously chosen measurement gates at various different times relative to the burst. In addition, gamma rays from parts a, b, and c occur only during the neutron burst, and it is these gamma rays that are traditionally referred to as "inelastic", even though only part a is truly inelastic.

As a relative yield, epithermal neutron yield may also be affected by the concentrations of all other elements and spectral components. By incorporating a neutron monitor that provides a neutron output to normalize the spectral analysis, the spectral yields may be computed as absolute count rates from each spectral component, in certain embodiments. In certain embodiments, the porosity estimate may use either relative yields or absolute spectral count rates.

A characterization of epithermal neutron yield for porosity or HI may be a globally optimized algorithm (or set of algorithms) for many different logging environments, or it may be a fit-for-purpose solution whose applicability would be limited to a restricted set of logging environments.

It may be anticipated that the measurement will respond to all hydrogen in the formation 12, including hydrogen (protons) whose T2 relaxation time is too short to appear in nuclear magnetic resonance (NMR) porosity, for example. Hence, if heavy oil, tar, or kerogen are present in the formation 12, the spectroscopy HI will be larger than the NMR porosity. The spectroscopy HI may also be lower than the formation total porosity if the invaded brine has a lower HI. Conversely, the spectroscopy HI may read higher than total porosity due to the effect of high formation atomic density in certain situations.

Hydrogen Capture Yield

Hydrogen is measured in the capture spectrum. The main hydrogen yield, known as hydrogen capture yield, contains gamma rays from the hydrogen of both the formation 12 and the borehole 26. The hydrogen capture yield is likely to respond to formation porosity as well as the same list of other effects above: HI of the pore fluids and formation matrix, HI of the borehole fluid, borehole size, tool standoff, and invasion.

Additionally, relative capture yields like hydrogen capture yield will be affected by competition for neutrons from other thermal absorbers in the surrounding materials. In this view, the hydrogen capture yield may be interpreted as a single-detector, uncompensated thermal porosity measurement.

Even more information is carried by a second hydrogen yield, hydrogen capture yield, which has a different characteristic spectral shape from the main hydrogen spectrum, and which represents hydrogen gamma rays that have undergone additional scattering in the formation 12. In certain embodiments, differential-scattering techniques may be used to separate the formation and borehole components for other elements such as chlorine. In addition, in certain embodiments, this formation/borehole technique may also be applied to hydrogen to better isolate the formation hydrogen yield.

By incorporating a neutron monitor that provides a neutron output to normalize the spectral analysis, the spectral yields may be computed as absolute count rates from each spectral component in certain embodiments. The porosity estimate may use either relative yields or absolute spectral count rates. The fit-for-purpose limitations and differences with respect to an NMR proton response described above will also be relevant for the spectroscopy hydrogen yields.

Algorithm Structure

In certain embodiments, a characterization of spectral yields for porosity or HI may be a globally optimized algorithm (or set of algorithms) for many different logging environments, or it may be a fit-for-purpose solution whose applicability would be limited to a restricted set of logging environments.

In certain embodiments, the calibration of spectral yields to porosity or HI may be performed by algorithms designed empirically with human judgement, may be the product of machine learning, or some combination thereof. The machine learning methods may include, but are not limited to, techniques such as multi-linear regression, a neural network, a support vector machine, a decision tree, an extended neural network architecture that may include a recurrent network, a long-short-term memory (LSTM) network, an attention model, or ensemble methods that combine multiple instances of the aforementioned techniques.

In addition, in certain embodiments, the algorithms may be derived based on any combination of laboratory measurements, computer simulations, and downhole log data. In addition, in certain embodiments, the input measurements may include any of the previously mentioned spectral yields (e.g., epithermal neutron yield, hydrogen capture yield, and so forth) or additional spectroscopy-derived measurements. In addition, in certain embodiments, inputs may also include features such a borehole diameter, borehole fluid density, and other aspects of the environment that affect the spectral yields.

Figure 6:
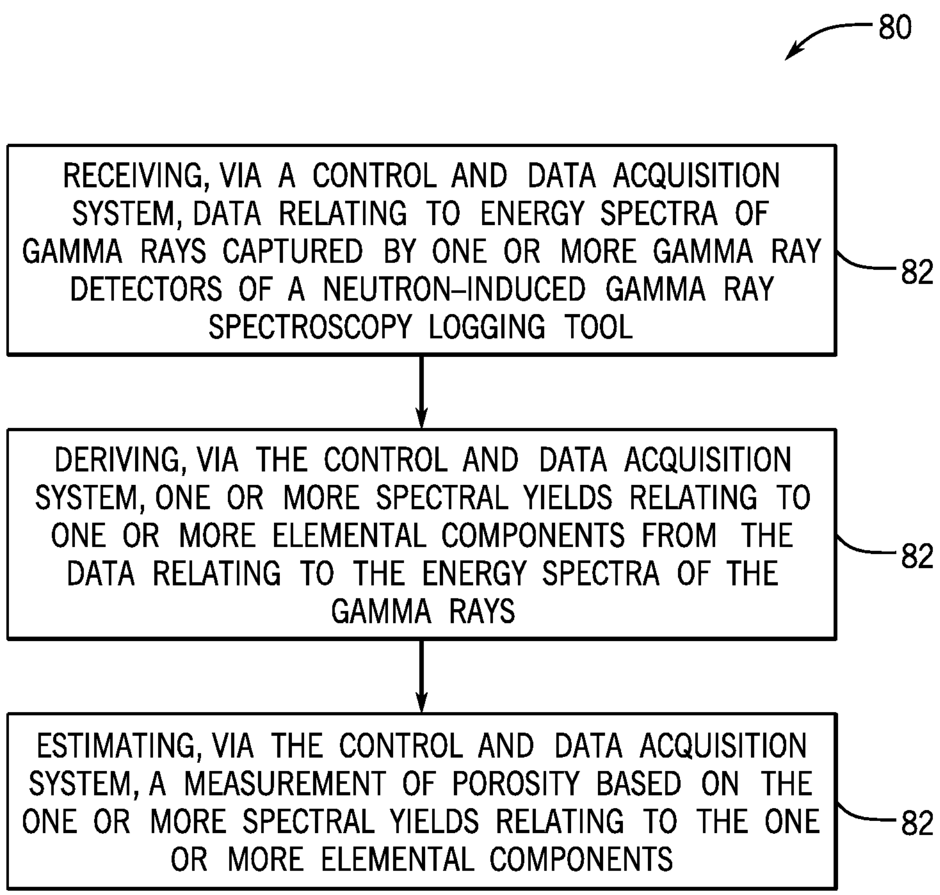
FIG. 6 is a flow diagram of a method of estimating porosity using neutron-induced gamma ray spectroscopy, in accordance with embodiments of the present disclosure.

FIG. 6 is a flow diagram of a method 80 of estimating porosity using neutron-induced gamma ray spectroscopy, as described in greater detail herein. In certain embodiments, the method 80 may include receiving, via the control and data acquisition system 42, data 40 relating to energy spectra of gamma rays captured by the one or more gamma ray detectors 64 of the neutron-induced gamma ray spectroscopy logging tool 54 (block 82). In addition, in certain embodiments, the method 80 may include deriving, via the control and data acquisition system 42, one or more spectral yields relating to one or more elemental components from the data 40 relating to the energy spectra of the gamma rays (block 84). In addition, in certain embodiments, the method 80 may include estimating, via the control and data acquisition system 42, a measurement of porosity based on the one or more spectral yields relating to the one or more elemental components (block 86).

In certain embodiments, the method 80 may include deploying the neutron-induced gamma ray spectroscopy logging tool 54 into a borehole 26 extending downhole through a geological formation 12 via logging-while-drilling (LWD), wireline, coiled tubing, or other mode of downhole conveyance. In addition, in certain embodiments, the one or more spectral yields relating to the one or more elemental components include one or more yields of the one or more gamma rays produced by the capture of epithermal neutrons. In other embodiments, the one or more spectral yields relating to the one or more elemental components include one or more yields of hydrogen captured by the one or more gamma ray detectors 64 of the neutron-induced gamma ray spectroscopy logging tool 54.

In addition, in certain embodiments, the method 80 may include inducing the energy spectra of the gamma rays via inelastic reactions of nuclei with fast neutrons. In other embodiments, the method 80 may include inducing the energy spectra of the gamma rays via radiative capture of neutrons by nuclei. In addition, in certain embodiments, the one or more spectral yields relating to the one or more elemental components represent one or more relative fractions of the energy spectra of the gamma rays associated with respective elemental components of the one or more elemental components. In addition, in certain embodiments, the one or more spectral yields relating to the one or more elemental components represent one or more absolute count rates that respective elemental components of the one or more elemental components contribute to the overall energy spectra of the gamma rays.

In addition, in certain embodiments, the control and data acquisition system 42 derives the one or more spectral yields relating to the one or more elemental components (block 84) and estimates the measurement of porosity (block 86) using one or more algorithms that utilize data relating to one or more environmental effects proximate the neutron-induced gamma ray spectroscopy logging tool 54. In certain embodiments, the one or more environmental effects include hydrogen index (HI) of pore fluids, HI of formation matrix, HI of a borehole fluid, formation lithology, formation salinity, borehole salinity, temperature, pressure, borehole size, tool standoff, invasion, or some combination thereof.

In addition, in certain embodiments, the one or more algorithms are derived based at least in part on computer modeling, downhole log data, or some combination thereof. In addition, in certain embodiments, the one or more algorithms are designed empirically based at least in part on human judgment. In addition, in certain embodiments, the one or more algorithms are based at least in part on machine learning including, but not limited to, techniques such as multi-linear regression, a neural network, a support vector machine, a decision tree, an extended neural network architecture that may include a recurrent network, a long-short-term memory (LSTM) network, an attention model, or ensemble methods that combine multiple instances of the aforementioned techniques.

In addition, in certain embodiments, the method 80 may include generating, via a radiochemical neutron source 62 of the neutron-induced gamma ray spectroscopy logging tool 54, neutrons that induce the energy spectra of the gamma rays. In other embodiments, the method 80 may include generating, via a pulsed neutron generator 62 of the neutron-induced gamma ray spectroscopy logging tool 54, neutrons that induce the energy spectra of the gamma rays. In addition, in certain embodiments, the one or more gamma ray detectors 64 of the neutron-induced gamma ray spectroscopy logging tool 54 may include one or more scintillator detectors. In addition, in certain embodiments, the one or more gamma ray detectors 64 of the neutron-induced gamma ray spectroscopy logging tool 54 may include one or more solid-state detectors.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method, comprising:

receiving, via a control and data acquisition system, data relating to energy spectra of gamma rays captured by one or more gamma ray detectors of a neutron-induced gamma ray spectroscopy logging tool;

deriving, via the control and data acquisition system, one or more spectral yields relating to one or more elemental components from the data relating to the energy spectra of the gamma rays; and estimating, via the control and data acquisition system, a measurement of porosity based on the one or more spectral yields relating to the one or more elemental components.

2. The method of claim 1, comprising deploying the neutron-induced gamma ray spectroscopy logging tool into a borehole extending downhole through a geological formation via logging-while-drilling (LWD), wireline, coiled tubing, or other mode of downhole conveyance.

3. The method of claim 1, wherein the one or more spectral yields relating to the one or more elemental components comprise one or more yields of the one or more gamma rays produced by the capture of epithermal neutrons.

4. The method of claim 1, wherein the one or more spectral yields relating to the one or more elemental components comprise one or more yields associated with the capture of neutrons by hydrogen as acquired by the one or more gamma ray detectors of the neutron-induced gamma ray spectroscopy logging tool.

5. The method of claim 1, comprising inducing the energy spectra of the gamma rays via inelastic reactions of nuclei with fast neutrons.

6. The method of claim 1, comprising inducing the energy spectra of the gamma rays via radiative capture of neutrons by nuclei.

7. The method of claim 1, wherein the one or more spectral yields relating to the one or more elemental components represent one or more relative fractions of the energy spectra of the gamma rays associated with respective elemental components of the one or more elemental components.

8. The method of claim 1, wherein the one or more spectral yields relating to the one or more elemental components represent one or more absolute count rates that respective elemental components of the one or more elemental components contribute to the overall energy spectra of the gamma rays.

9. The method of claim 1, wherein the control and data acquisition system derives the one or more spectral yields relating to the one or more elemental components and estimates the measurement of porosity using one or more algorithms that utilize data relating to one or more environmental effects proximate the neutron-induced gamma ray spectroscopy logging tool.

10. The method of claim 9, wherein the one or more environmental effects comprise hydrogen index (HI) of pore fluids, HI of formation matrix, HI of a borehole fluid, formation lithology, formation salinity, borehole salinity, temperature, pressure, borehole size, tool standoff, invasion, or some combination thereof.

11. The method of claim 9, wherein the one or more algorithms are derived based at least in part on computer modeling, laboratory measurements, downhole log data, or some combination thereof.

12. The method of claim 9, wherein the one or more algorithms are designed empirically based at least in part on human judgment.

13. The method of claim 9, wherein the one or more algorithms are based at least in part on machine learning.

14. The method of claim 1, comprising generating, via a radiochemical neutron source of the neutron-induced gamma ray spectroscopy logging tool, neutrons that induce the energy spectra of the gamma rays.

15. The method of claim 1, comprising generating, via a pulsed neutron generator of the neutron-induced gamma ray spectroscopy logging tool, neutrons that induce the energy spectra of the gamma rays.

16. The method of claim 1, wherein the one or more gamma ray detectors of the neutron-induced gamma ray spectroscopy logging tool comprise one or more scintillator detectors or one or more solid-state detectors.

17. A system, comprising:

a neutron-induced gamma ray spectroscopy logging tool, comprising:

a neutron source configured to generate neutrons to induce energy spectra of gamma rays; and one or more gamma ray detectors configured to detect the energy spectra of the gamma rays; and a control and data acquisition system configured to:

receive data relating to the energy spectra of the gamma rays captured by the one or more gamma ray detectors of the neutron-induced gamma ray spectroscopy logging tool;

derive one or more spectral yields relating to one or more elemental components from the data relating to the energy spectra of the gamma rays; and estimate a measurement of porosity based on the one or more spectral yields relating to the one or more elemental components.

18. The system of claim 17, wherein the one or more spectral yields relating to the one or more elemental components comprise one or more yields of the one or more gamma rays produced by the capture of epithermal neutrons.

19. The system of claim 17, wherein the one or more spectral yields relating to the one or more elemental components comprise one or more yields associated with the capture of neutrons by hydrogen as acquired by the one or more gamma ray detectors of the neutron-induced gamma ray spectroscopy logging tool.

20. A control and data acquisition system, comprising:

one or more processors configured to execute instructions stored on memory media of the control and data acquisition system, wherein the instructions, when executed by the one or more processors, cause the control and data acquisition system to:

receive data relating to energy spectra of gamma rays captured by one or more gamma ray detectors of a neutron-induced gamma ray spectroscopy logging tool;

derive one or more spectral yields relating to one or more elemental components from the data relating to the energy spectra of the gamma rays; and estimate a measurement of porosity based on the one or more spectral yields relating to the one or more elemental components.

* * * * *